(12) United States Patent
Kim et al.

(10) Patent No.: US 11,225,223 B2
(45) Date of Patent: Jan. 18, 2022

(54) WIPER DEVICE

(71) Applicant: CAP CORPORATION, Gyeongsangbuk-do (KR)

(72) Inventors: Myoung-Yeon Kim, Ulsan (KR); Jae-Yong Jeong, Daegu (KR)

(73) Assignee: CAP CORPORATION, Gyeongsangbuk-do (KR)

( * ) Notice: Subject to any disclaimer, the term of this patent is extended or adjusted under 35 U.S.C. 154(b) by 37 days.

(21) Appl. No.: 16/794,987

(22) Filed: Feb. 19, 2020

(65) Prior Publication Data

US 2020/0269817 A1  Aug. 27, 2020

(30) Foreign Application Priority Data

Feb. 25, 2019 (KR) .................... 10-2019-0021931

(51) Int. Cl.
*B60S 1/38* (2006.01)
(52) U.S. Cl.
CPC .......... *B60S 1/3849* (2013.01); *B60S 1/3801* (2013.01); *B60S 1/3806* (2013.01); *B60S 2001/3813* (2013.01); *B60S 2001/3815* (2013.01)
(58) Field of Classification Search
CPC .... B60S 1/3801; B60S 1/3806; B60S 1/3849; B60S 2001/3813; B60S 2001/3815
USPC ........................................ 15/250.44, 250.46
See application file for complete search history.

(56) References Cited

U.S. PATENT DOCUMENTS

| | | | | |
|---|---|---|---|---|
| 3,140,501 A | * | 7/1964 | MacPherson | B60S 1/3801 15/250.44 |
| 3,733,643 A | * | 5/1973 | Arman | B60S 1/3801 15/250.46 |
| 3,864,783 A | * | 2/1975 | Arman | B60S 1/3801 15/250.46 |
| 4,953,251 A | * | 9/1990 | Chow | B60S 1/3801 15/250.46 |
| 5,742,973 A | * | 4/1998 | Kessler | B60S 1/3801 15/250.44 |
| 8,104,137 B2 | | 1/2012 | An et al. | |

(Continued)

FOREIGN PATENT DOCUMENTS

| | | | |
|---|---|---|---|
| GB | 1183446 | * | 3/1970 |
| GB | 1378533 | * | 12/1974 |

(Continued)

OTHER PUBLICATIONS

Korean Office Action dated Feb. 9, 2020 in corresponding South Korean Patent Application No. 10-2019-0021931.
Korean Office Action in, KR No. 10-2019-0021931.

*Primary Examiner* — Gary K. Graham
(74) *Attorney, Agent, or Firm* — Grossman, Tucker, Perrault & Pfleger, PLLC

(57) ABSTRACT

A wiper device is disclosed. The wiper device of the present invention is coupled to a wiper arm and removes a foreign substance attached to a windshield. The wiper device includes a contact member configured to wipe off the foreign substance, a lever structure configured to press the contact member to be tightly in contact with the windshield and having a plurality of levers connected in a multi-level structure, and an adapter configured to be coupled to the lever structure and connected to the wiper arm, wherein the lever structure comprises a connection member configured to hinge-connect at least at least one pair of the plurality of levers.

4 Claims, 9 Drawing Sheets

(56) References Cited

U.S. PATENT DOCUMENTS

| | | |
|---|---|---|
| 8,745,812 B2 | 6/2014 | Kruse et al. |
| 2005/0166349 A1* | 8/2005 | Nakano .................. B60S 1/3806 15/250.201 |
| 2013/0219649 A1* | 8/2013 | Tolentino .............. B60S 1/3806 15/250.32 |

FOREIGN PATENT DOCUMENTS

| | | | |
|---|---|---|---|
| GB | 2041730 | * | 9/1980 |
| KR | 20-0445909 | | 9/2009 |
| KR | 200445909 Y1 | | 9/2009 |
| KR | 10-2010-0064983 | | 6/2010 |

* cited by examiner

WIPER DEVICE

CROSS REFERENCE TO RELATED APPLICATION(S)

This application claims the benefit under 35 USC § 119(a) of Korean Patent Application No. 10-2019-0021931 filed on Feb. 25, 2019 in the Korean Intellectual Property Office, the entire disclosure of which is incorporated herein by reference for all purposes.

BACKGROUND

1. Field

The present invention relates to a wiper device.

2. Description of Related Art

When a windshield of a vehicle in driving is contaminated by various substances, including dust in the atmosphere or rain or snow, it becomes difficult to secure a clear view and can affect the safety of driving. Thus, a wiper for clearing snow, rain, or debris is equipped on the windshield in order to secure the clear view for the safety of a driver. The wiper device is connected to a wiper arm installed in the vehicle and is operated by the wiper arm.

A tournament structure with multi-level lever among wiper devices has a structure in which an extension lever (a secondary lever) and a york are sequentially connected to a primary lever which is coupled with a wiper arm to receive the force necessary for operating a wiper.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide a wiper device having a new connection structure between levers in a wiper device having a multi-level lever structure.

There is provided a wiper device coupled to a wiper arm to remove a foreign substance, including a contact member configured to wipe off the foreign substance, a lever structure configured to press the contact member to be in contact with a windshield and having a plurality of levers connected in a multi-level structure, and an adapter configured to be coupled to the lever structure and connected to the wiper arm, wherein the lever structure comprises a connection member configured to hinge-connect at least a pair of the plurality of levers.

According to the present invention, it is possible to provide a wiper device with a new connection structure in which levers are hinge-connected through a connection member, rather than a direct connection of levers.

In addition, the connection member made of a synthetic resin material is interposed between the levers made of a metal material so that it is possible to prevent the direct friction between the metal materials.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Hereinafter, the embodiment of the present invention will be described in detail with reference to the accompanying drawings.

Figure 1:
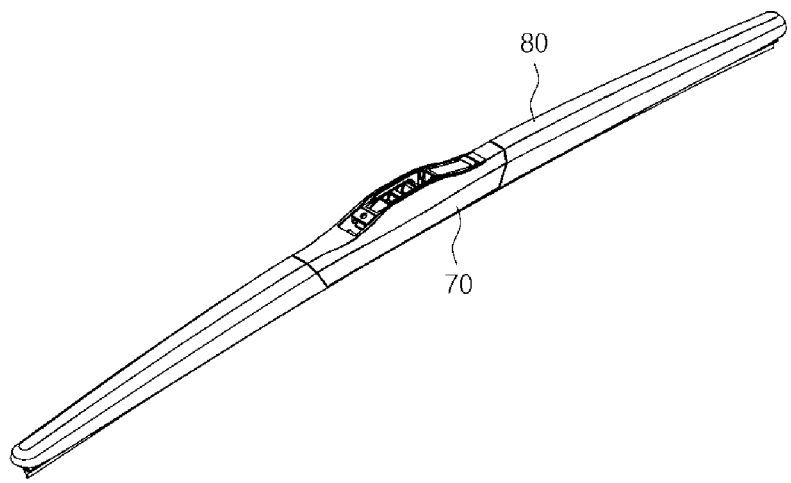
FIG. 1 is a perspective view illustrating a wiper device according to an embodiment of the present invention.
Figure 2:
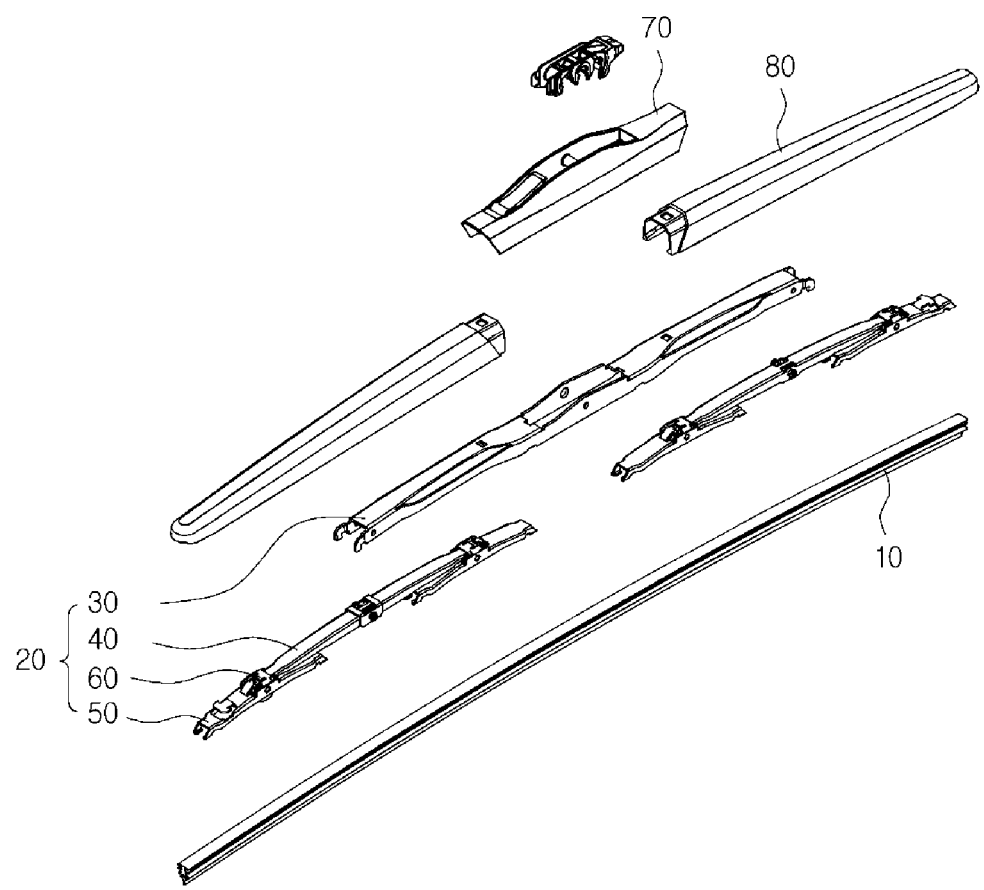
FIG. 2 is an exploded view illustrating a wiper device according to an embodiment of the present invention.

FIG. 1 is a perspective view illustrating a wiper device according to an embodiment of the present invention and FIG. 2 is an exploded view illustrating a wiper device according to an embodiment of the present invention.

The wiper device according to an embodiment of the present invention is a wiper device for removing foreign substances attached to a windshield and includes a contact member 10, a lever structure 20, a connection member 60, and an adapter 70.

The contact member 10 may be tightly contacted to a windshield to wipe off foreign substances and include various known contact members 10 such as a rubber wiper blade. The contact member 10 may further include a support member for elastically supporting the contact member 10.

The lever structure 20 presses and supports the contact member 10 toward the windshield so that the contact member 10 comes into tight contact with the windshield. The lever structure 20 may have a structure in which a plurality of levers are connected in a multi-level structure. Specifically, the lever structure 20 may have a structure in which a plurality of levers are connected in a multi-level structure from the wiper arm to the contact member 10. That is, the lever closest to the wiper arm may be the uppermost lever and a plurality of lower levers may be connected to each other in order to expand the structure of the lever toward the contact member 10.

The lever structure 20 may be connected to the wiper arm through the adapter 70 to receive the pressing pressure from the wiper arm. The pressing pressure received from the wire arm may be transmitted to each of the connected levers and the pressing pressure transmitted to the levers may be transmitted to the contact member 10 to bring the contact member 10 into tight contact with the curved surface of the vehicle windshield.

Particularly, the lever structure 20 of the present invention may include the connection member 60 for connecting at least a pair of levers among the plurality of levers in a hinge structure. That is, a plurality of conventional levers are hinge-connected through direct contact (connection) with each other, whereas at least a part of the lever structure 20 of the present invention may be hinge-connected through the connection member 60, rather than direct connection of the levers.

Specifically, the connection member may be coupled to a first lever, which is one of the plurality of levers in the lever structure 20, in a hinged structure. The second lever adjacent to the first lever of the plurality of levers may be coupled to the connection member 60. Accordingly, the neighboring first and second levers of the plurality of levers may be connected in a hinge structure.

Figure 3:
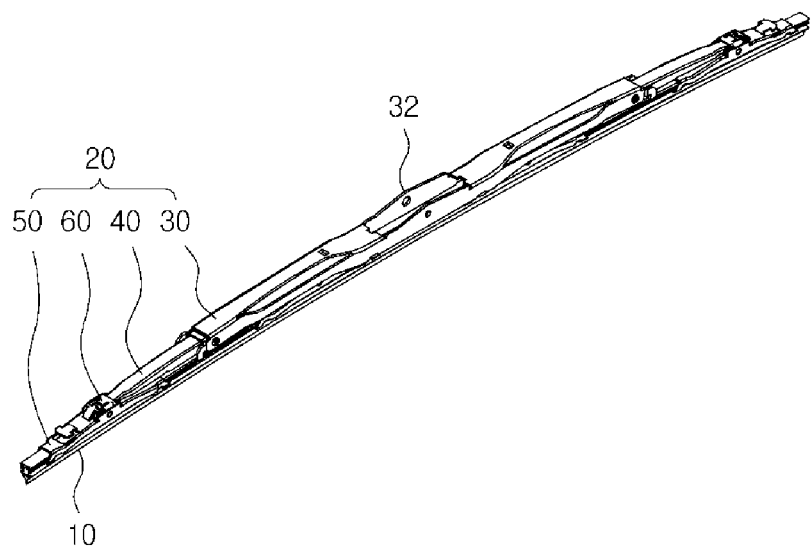
FIG. 3 is a diagram illustrating a lever structure coupled to a contact member in a wiper device according to an embodiment of the present invention.
Figure 4:
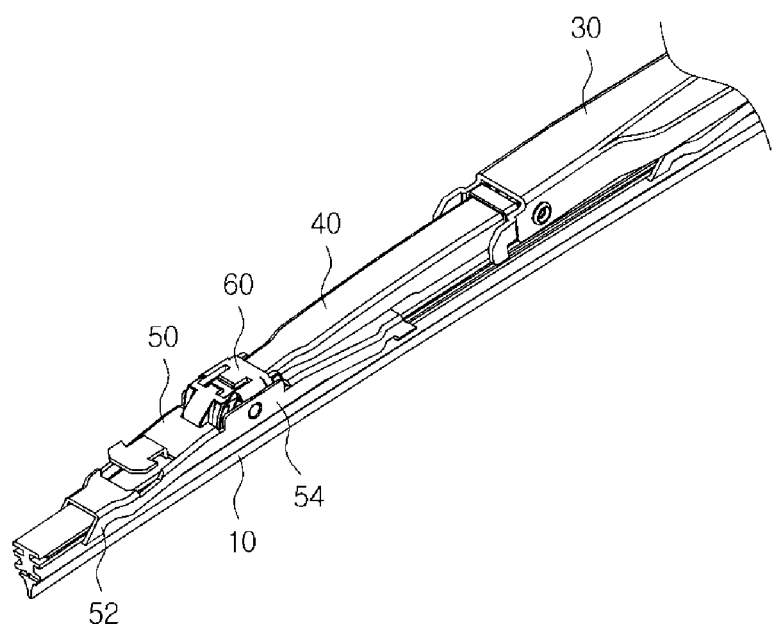
FIG. 4 is an enlarged view illustrating one side of a lever structure in a wiper device according to an embodiment of the present invention.

FIG. 3 is a diagram illustrating a lever structure coupled to a contact member 10 in a wiper device according to an embodiment of the present invention and FIG. 4 is an enlarged view illustrating one side of a lever structure in a wiper device according to an embodiment of the present invention.

For example, the lever structure 20 of the present embodiment may include a primary lever 30 and an extension lever 40 hinge-connected to the primary lever 30.

Referring to FIG. 3 and FIG. 4, the lever structure 20 of the present embodiment may include a primary lever 30 disposed in the center and a pair of extension levers 40 hinge-connected to both ends of the primary lever 30. In addition, a yoke 50 may be connected to the extension lever 40 in a hinge structure. A grip 52 that holds the contact member 10 may be provided at an end portion of the yoke 50.

Here, the extension lever 40 and the yoke 50 may be hinge-connected through the connection member 60. Therefore, in the present embodiment, the first lever may be the yoke 50 and the second lever may be the extension lever 40.

Figure 5:
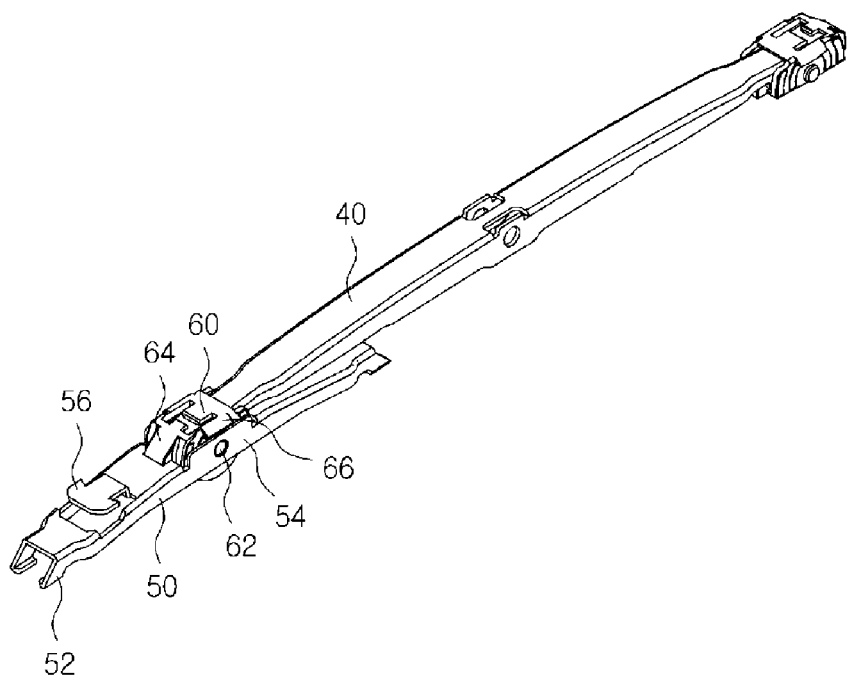
FIG. 5 to FIG. 7 are enlarged views illustrating a connection of an extension lever and a yoke in a lever structure of a wiper device according to an embodiment of the present invention.
Figure 6:
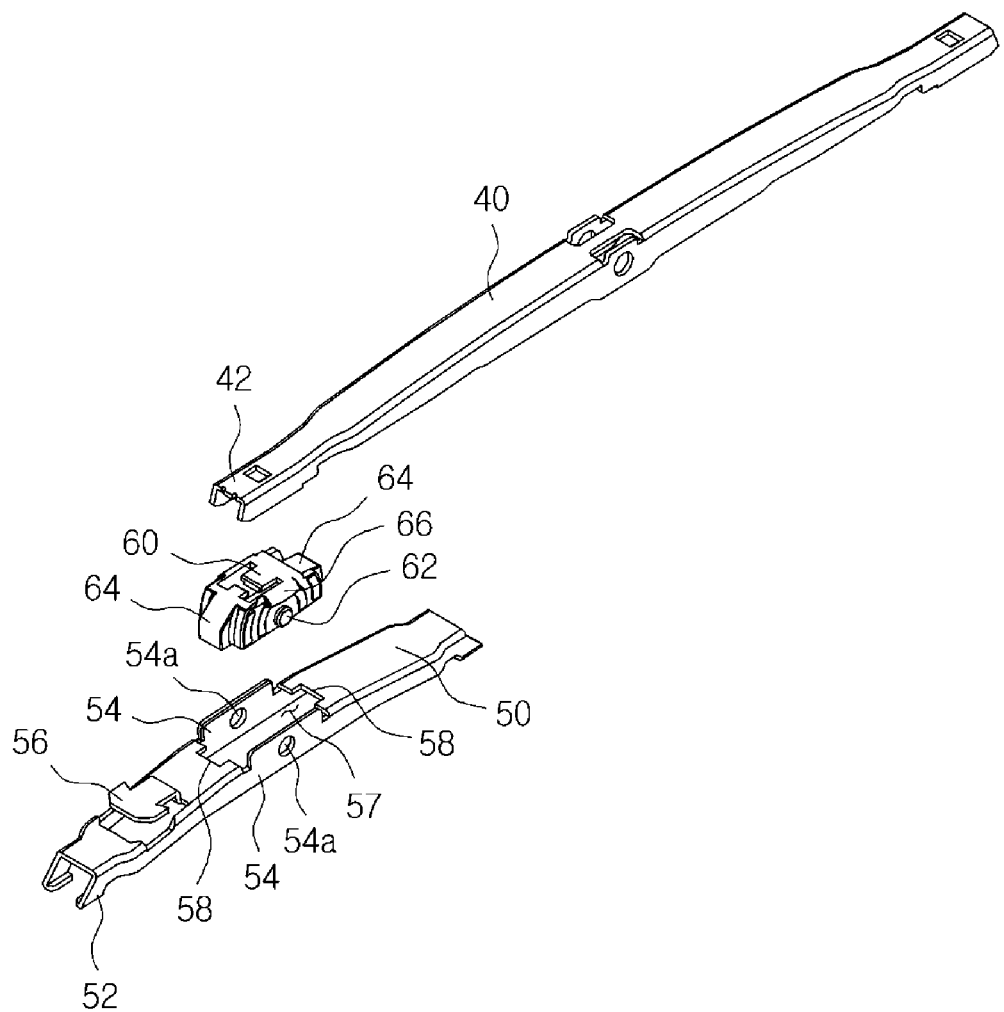
Figure 7:
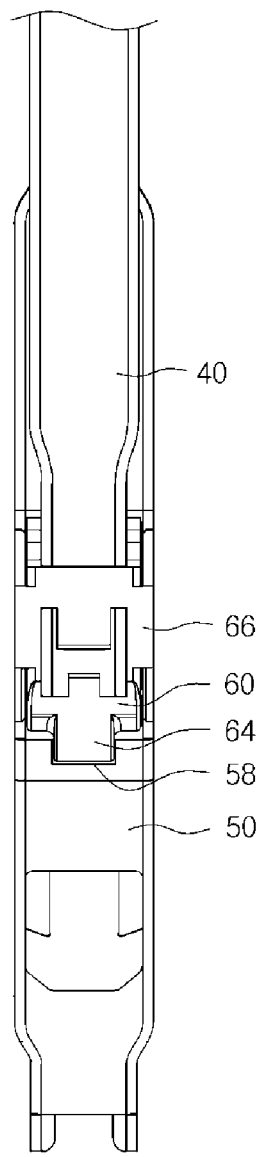

FIG. 5 to FIG. 7 are enlarged views illustrating a connection of an extension lever and a yoke in a lever structure of a wiper device according to an embodiment of the present invention.

Referring to FIG. 5 to FIG. 7, a yoke 50 may include a pair of hinge walls 54 facing each other. The connection member 60 may be disposed between the pair of hinge walls 54 to be coupled to the pair of hinge walls 54 in a hinge structure. One end portion 42 of the extension lever 40 which is the second lever may be inserted into and coupled to the connection member 60.

The first lever, which is the yoke 50 of the present embodiment, and the second lever, which is the extension lever 40 of the present embodiment, may be made of a metal, and the connection member 60 may be made of a synthetic resin. When the extension lever 40 made of a metal is hinge-connected to the yoke 50 made of a metal, the connection member made of a synthetic resin may be interposed between the metal materials. Thus, it may prevent direct friction between the metal materials.

Figure 8:
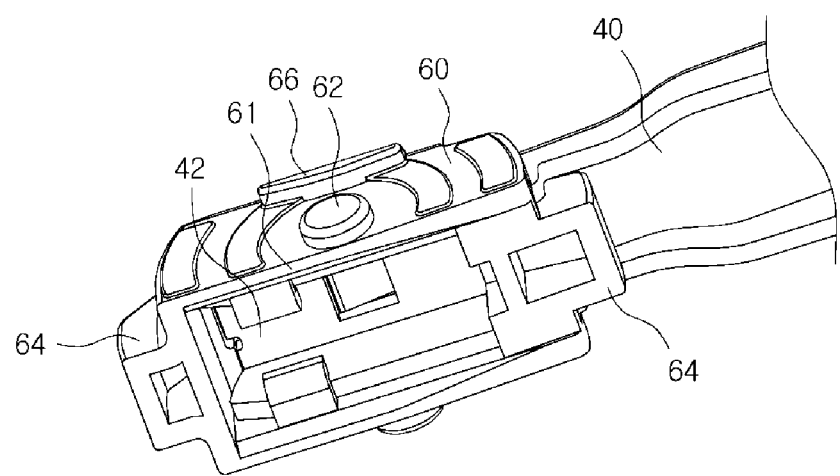
FIG. 8 and FIG. 9 are enlarged views illustrating a connection member in a lever structure of a wiper device according to an embodiment of the present invention.
Figure 9:
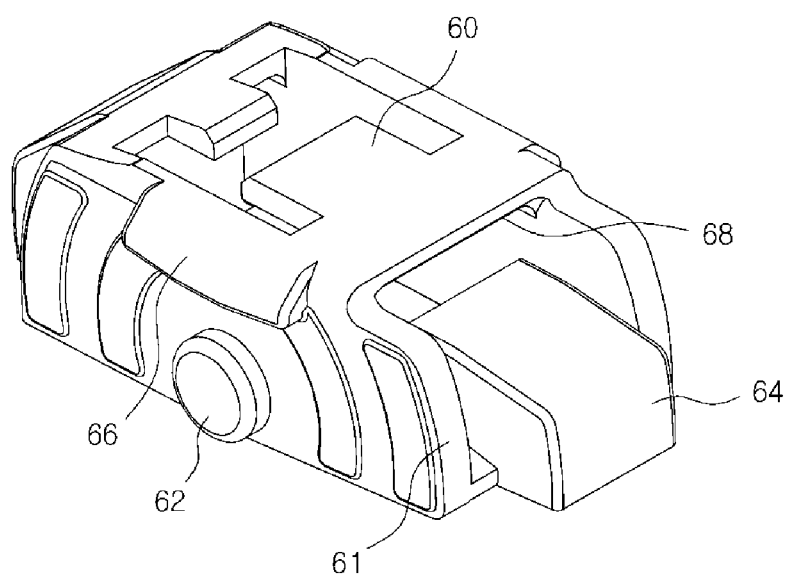

FIG. 8 is an enlarged view illustrating a connection member in a lever structure of a wiper device according to an embodiment of the present invention.

Referring to FIG. 6 and FIG. 8, hinge grooves 54a may be formed in a row in the pair of hinge walls 54 in the yoke 50. The hinge groove 54a may be a pass-through groove or a one side blocked groove. The connection member 60 may be formed with a pair of hinge protrusions 62 and inserted into the hinge groove 54a of the hinge wall 54 so that the connection member 60 is hinge-connected to the yoke 50.

Here, the connection member 60 may be formed with a damage prevention protrusion 66 to prevent the hinge protrusion 62 from being damaged when an external force is applied to the connection member 60.

Referring to FIG. 5 and FIG. 8, the damage prevention protrusion 66 may be disposed adjacent to the hinge protrusion 62 and protruded to be caught on the hinge wall 54. The damage prevention protrusion 66 may be formed on the hinge protrusion 62 so as to be caught at an upper edge of the hinge wall 54. Thus, when an external force is applied to the connection member 60 (for example, when the connection member 60 is pressed toward the contact member 10), the damage prevention protrusion 66 may be supported by the hinge wall 54 to prevent the hinge protrusion 62 from being damaged. If the damage prevention protrusion 66 is supported by the hinge wall 54 and is not subjected to an external force, the external force is concentrated on the hinge protrusion 62, thereby increasing the risk of damage of the hinge protrusion 62.

A part of the connection member 60 may be inserted into the first lever, which is the yoke 50 of the present embodiment, so that the force in the lateral direction that the first lever receives when the wiper device is operated may be distributed to prevent deformation of the first lever.

Particularly, a via part 57 may be formed between the pair of hinge walls 54 in the first lever in which the connection member 60 is inserted. A concave insertion groove 58 may be formed at an edge of the via part 57 facing the connection member 60 in the longitudinal direction of the first lever. A support protrusion 64 to be inserted into an insertion groove 58 may be formed in the connection member 60. Accordingly, when the second lever applies a force pushing the connection member 60 in the lateral direction of the first lever, the support protrusion 64 may be supported by an inner wall of the insertion groove 58 to distribute the force.

Referring to FIG. 5 and FIG. 6, the via part 57 may be formed between the pair of hinge walls 54 in the yoke 50, which is the first lever of the present embodiment, and the connection member 60 may be inserted into the via part 57. Here, since the connection member 60 is inserted into the via part 57 and connected to the hinge walls 54 by a hinge, when the wiper device is operated, the connection member 60 coupled to the extension lever 40 may push to the hinge walls 54, causing a gap (deformation) between the hinge walls 54 of the york 50.

The concave insertion groove 58 may be thus formed at an edge of the via part 57 disposed in the longitudinal direction of the yoke 50 in order to prevent such a deformation and the support protrusion 64 to be inserted into the insertion groove 58 may be formed in the connection member 60. When the wiper device is operated to let the connection member 60 coupled with the extension lever 40 push the yoke 50 laterally, the support protrusion 64 of the connection member 60 may be supported by an inner wall of the insertion groove 58 to distribute the force. Therefore, the force for pushing the hinge wall 54 of the yoke 50 outwardly is reduced, so that the deformation of opening the pair of hinge walls 54 can be effectively prevented.

The connection member 60 may be further provided with a connection groove 68 into which one end of the second lever, which is the extension lever 40 of the present embodiment, is inserted. Here, the one end of the second lever inserted into the connection groove 68 may support so that the hinge protrusion 62 may not be pushed inwardly.

Referring to FIG. 8, the one end 42 of the extension lever 40 made of a metal is inserted into the connection member 60 made of a synthetic resin, and the side wall 61 of the connection member 60 with the hinge protrusion 62 formed outside may be supported from the inside. It may thus effectively prevent the hinge protrusion 62 from being pushed inwardly which can be caused by elastic deformation or damage of the connection member 60 made of a synthetic resin.

Particularly, after the connection member 60 is inserted between the pair of hinge walls 54 and the hinge protrusion 62 is inserted into the hinge groove 54a, one end of the second lever, which is the extension lever 40 of the present embodiment, may be inserted into and coupled to the connection groove 68. After the second lever is coupled to the connection member 60, the hinge protrusion 62 is no longer pushed inwardly, thereby effectively preventing the connection member 60 from being separated.

The characteristic structure of the present invention is illustrated with the structure in which the first lever becomes the yoke 50 and the second lever becomes the extension lever 40 in the present exemplary embodiment, but is not limited thereto. When a second extension lever other than the yoke 50 is extended to the extension lever 40, the first lever may be a second extension lever and the second lever may be an extension member 40. In addition, when the yoke 50 is connected to a second extension lever, the first lever may be the yoke 50 and the second lever may be a second extension member.

The adapter 70 may receive force from the wiper arm and transmit it to the lever structure 20. The adapter 70 may be coupled to the lever structure 20 and the wiper arm may be connected thereto. The adapter 70 may be connected to and mounted in a connection hole, a connection shaft, or the like formed in the lever structure 20.

Referring to FIG. 1 to FIG. 3, a part of the adapter 70 may be inserted into the connection hole 32 formed in the lever structure 20, so that the adapter 70 may be mounted on the lever structure 20.

The wiper device according to an embodiment of the present invention may further include a cover member 80 covering the lever structure 20. The cover member 80 may have a spoiler function to provide an additional pressing pressure to the lever structure 20 by the force of air.

Referring to FIG. 1 to FIG. 3, the wiper device of the present embodiment may include a pair of cover members 80 covering from the central lever 30 to the yoke 50.

Here, a connector 56 (see FIG. 5) for fixing the cover member 80 may be formed on at least one of the levers of the lever structure 20. For example, the connector 56 may be formed on at least one of the primary lever 30, the extension lever 40, and the yoke 50.

The connector 56 may have an arrow shape facing outward based on a lengthwise direction of the lever structure 20. Here, a "¬" shape may be inserted into and coupled to a part of the cover member 80.

Referring to FIG. 5, the connector 56 having a "¬" shape protruded toward the outside from an upper surface of the yoke 50 may be formed. A lower part of the "¬" shape may be coupled to an upper surface of the yoke 50 and the upper end of the free end may face outwardly.

Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims.

It shall be also appreciated that many embodiments other than the embodiment described above are present in the claims of the present invention.

DESCRIPTION OF REFERENCE NUMERALS

10: Contact member
20: Lever structure
30: Primary lever
40: Extension lever
50: York
54: Hinge wall
57: Via part
58: Insertion groove
60: Connection member
62: Hinge protrusion
64: Support protrusion
66: Damage prevention protrusion
68: Connection groove
70: Adapter
80: Cover member

What is claimed is:

1. A wiper device coupled to a wiper arm to remove a foreign substance, comprising:
   a contact member configured to wipe off the foreign substance;
   a lever structure configured to press the contact member to be in contact with a windshield and having a plurality of levers connected in a multi-level structure; and
   an adapter configured to be coupled to the lever structure and connected to the wiper arm,
   wherein the lever structure comprises a connection member configured to hinge-connect at least a pair of the plurality of levers,
   wherein a first lever of the plurality of levers is hinge-connected to the connection member, and a second lever of the plurality of levers is fixedly coupled to the connection member, such that the first lever and the second lever are hinge-connected with each other,
   wherein the first lever is formed with a pair of hinge walls facing each other, and the connection member is interposed between the pair of hinge walls,
   wherein the pair of hinge walls are each formed with a hinge groove, and the connection member is formed with a pair of hinge protrusions on either lateral surface thereof extending outwardly away from one another, the pair of hinge protrusions being configured to be inserted, respectively, into the hinge grooves, and
   wherein the connection member is formed with a connection groove, one end of the second lever is fitted into the connection groove, such that the one end of the second lever supports the pair of hinge protrusions so they cannot be pushed inwardly towards one another inside the connection member away from the first lever.

2. The wiper device of claim 1, wherein the connection member is provided with damage prevention protrusions disposed adjacent to the pair of hinge protrusions and protruding to be supported by the pair of hinge walls, and the damage prevention protrusions are supported on the pair of hinge walls to prevent the pair of hinge protrusions from being damaged when external force is applied to the connection member.

3. The wiper device of claim 1, wherein the first lever is formed with a via part between the pair of hinge walls into which the connection member is inserted, a concave insertion groove is formed at an edge of the via part facing the connection member in the longitudinal direction of the first lever, and the connection member is formed with a support protrusion to be inserted into the insertion groove such that the support protrusion is supported on an inner wall of the insertion groove when the second lever applies a force pushing the connection member in the lateral direction of the first lever.

4. The wiper device of claim 1, further comprising a cover member covering the lever structure,
   wherein at least one of the levers of the lever structure is provided with a connector fixing the cover member,
   wherein the connector has a "¬" shape toward the outside, based on a lengthwise direction of the lever structure, and
   wherein the "¬" shape is inserted into and coupled to a part of the cover member.

\* \* \* \* \*